United States Patent [19]

Yamauchi et al.

[11] 4,228,458
[45] Oct. 14, 1980

[54] OPTICAL COLOR-SEPARATION SYSTEM FOR USE IN A COLOR TELEVISION CAMERA

[75] Inventors: Toshiro Yamauchi, Omiya; Takemi Saito, Kawagoe; Shigehiro Kanayama, Omiya, all of Japan

[73] Assignee: Fuji Photo Optical Co., Ltd., Saitama, Japan

[21] Appl. No.: 911,174

[22] Filed: May 31, 1978

[30] Foreign Application Priority Data

May 31, 1977 [JP] Japan ............... 52-63593

[51] Int. Cl.³ ............... H04N 9/09; H04N 5/30
[52] U.S. Cl. ............... 358/55; 358/225
[58] Field of Search ............... 358/55, 225, 227, 50, 358/52; 354/195; 352/140; 350/225; 335/210

[56] References Cited

U.S. PATENT DOCUMENTS

| | | | |
|---|---|---|---|
| 3,126,446 | 3/1964 | Blancha | 358/55 |
| 3,293,357 | 12/1966 | Doi et al. | 358/55 |
| 3,973,231 | 8/1976 | Saito et al. | 335/210 |
| 4,080,624 | 3/1978 | Ando et al. | 358/55 |

Primary Examiner—Bernard Konick
Assistant Examiner—Aristotelis M. Psitos

[57] ABSTRACT

A color separation optical system for a color television camera of relay lens type in which a set of color separating optical elements are provided between a single first relay lens and three second relay lenses for three primary colors. The first relay lens is located substantially on the image plane of the taking lens of the television camera. A field lens is provided between the taking lens and the first relay lens. The power of the field lens is determined according to the focal length of the taking lens. The field lens is removed when the exit pupil of the taking lens is registered with the entrance pupil of the first relay lens. In this case, the first relay lens is axially moved toward the taking lens to make the front focal plane of the first relay lens registered with the image plane of the taking lens. The axial movement of the first relay lens is conducted by means of a mechanism which is operable from outside of the television camera.

3 Claims, 3 Drawing Figures

OPTICAL COLOR-SEPARATION SYSTEM FOR USE IN A COLOR TELEVISION CAMERA

BACKGROUND OF THE INVENTION

1. Field of the Invention

This invention relates to a color separation optical system for a color television camera, and more particularly to an improvement in a color separation optical system for a color television camera of relay lens type.

2. Description of the Prior Art

A color separation optical system for a color television camera of the so called relay lens type includes a relay lens system between the taking lens and the image pick-up tubes of the camera. The relay lens system divides an image of the object of the camera focused by the taking lens into three color images of red, green and blue. The three color images are then focused on the three image pick-up tubes. The relay lens system comprises a single first relay lens, color separation optical elements such as prism blocks or dichroic mirrors, and three second relay lenses provided one for each of the three color images. In the color separation optical system of the relay lens type as described above, two color images are obtained by reflection and one color image is obtained by transmission from the color separation optical elements, and it is possible to make the optical axes of the two second relay lenses for the two color images obtained by reflection parallel to the optical axis of the other second relay lens for the other color image obtained by transmission. Therefore, it is possible to orient the three color tubes in parallel to each other and accordingly to make the size of the television camera compact and avoid the influence of terrestrial magnetism of the tubes.

Further, in the above described color separation optical system of the relay lens type, the image of the object focused by the taking lens is formed on the incident side focal plane of the first relay lens so that light is collimated by the first relay lens until it reaches the second relay lenses. When the exit pupil of the taking lens is registered with the entrance pupil of the first relay lens, an image is obtained in a good condition by making the image focused by the taking lens formed on the incident side namely the front focal plane of the first relay lens. However, when the exit pupil of the taking lens is not registered with the entrance pupil of the first relay lens, the brightness of the image in the marginal portion thereof is lowered and sometimes a marginal part of the image is cut out. In order to prevent the above problem, it has been known in the art to insert a field lens having a proper power between the taking lens and the first relay lens so as to make the pupils substantially registered with each other. The above measurement utilizing a field lens has a defect in that the field lens must be very carefully handled because the field lens is positioned on the image plane of the taking lens and accordingly the scratches or dusts on the surface of the taking lens are apt to be observed in the picture of the television.

On the other hand, when the exit pupil of the taking lens is registered with the entrance pupil of the relay lens system, there is no need to insert the field lens in the optical system. However, it is disadvantageous to limit the kind of the taking lens to the one which has the exit pupil registered with the entrance pupil of the relay lens system. This is because the color television camera provided with the relay lens type color separation optical system is normally expected to have a feature that a variety of kinds of taking lenses can be interchanged by changing a field lens in the camera. In the conventional color television camera of the relay lens type, therefore, it is quite popular to interchange a field lens to accommodate to a variety of taking lenses. Accordingly, in this kind of the color television camera, even when the exit pupil of the taking lens is registered with the entrance pupil of the first relay lens and no field lens is necessitated, a plane parallel plate is usually inserted as a field lens of no power.

The above discussion will be described in further detail with reference to FIG. 1 hereinbelow. Referring to FIG. 1, a field lens 2 is inserted between a taking lens 1 and a first relay lens 3 of a relay lens system. The field lens 2 has a certain thickness and the first principal plane (front principal plane) A thereof is not registered with the second principal plane (rear principal plane) B, and a space H is formed therebetween. An image of the object is first focused on the front principal plane A by taking lens 1 which is then transferred to the rear principal plane B. Therefore, by making the front focal plane of the first relay lens 3 registered with the rear principal plane B of the field lens 2, the light flux behind the first relay lens 3 can be collimated and an image can be obtained in a good condition by the color separation optical system. In this case, the power of the field lens is determined according to the displacement of the exit pupil of the taking lens 1 from the entrance pupil of the relay lens system including the first relay lens 3. In order to accommodate to the various kinds of taking lenses, various kinds of field lens of different power are prepared.

When the exit pupil of the taking lens 1 is registered with the entrance pupil of the relay lens system, the power of the field lens 2 is determined to be zero which means no field lens is required. However, if the field lens is completely removed from the optical system, the image plane of the taking lens 1 is displaced from the focal plane of the first relay lens 3 by the space H as shown in FIG. 1 and accordingly the light is not collimated by the first relay lens 3. This results in failure in obtaining a color image in a good condition by the television camera.

In order to prevent this problem, the optical path length should be corrected by the space H in FIG. 1. The relay lens system including the first relay lens 3 is firmly fixed to the camera housing, and the taking lens 1 is also fixed to the camera housing, and accordingly, it is almost impossible to move these lenses 1 and 3 along the optical axis thereof to compensate for the space H. Therefore, in the prior art, a plane parallel plate having a thickness H is inserted between the taking lens 1 and the first relay lens 3 as a kind of field lens for compensating for the optical path length of the space H. Therefore, even when the field lens is not required, a plane parallel plate is used as a field lens, and accordingly, the handling of the field lens must be carefully conducted so as not to carry dusts or scratches on the surface of the field lens including the plane parallel plate.

SUMMARY OF THE INVENTION

The principal object of the present invention is to provide a color separation optical system of relay lens type in which a field lens can be completely removed when power is not required in the field lens and the compensation for the space H is conducted by the first relay lens of the relay lens system in the color separation optical system.

Another object of the present invention is to provide a color separation optical system of relay lens type in which a first relay lens of the relay lens system in the optical system is movable along the optical axis thereof by an operation from outside of the television camera housing retaining therein the color separation optical system.

Still another object of the present invention is to provide a color separation optical system in which the mechanical position of the color separation optical system is adjustable with respect to the position of the taking lens, whereby the displacement of the housing retaining therein the color separation optical system with respect to the taking lens mount can be compensated.

The color separation optical system in accordance with the present invention is characterized in that the first relay lens of the relay lens system located behind the taking lens of a color television camera is made axially movable. When the field lens is not necessary between the taking lens and the first relay lens, no field lens is inserted therebetween and the first relay lens is moved forward to the taking lens by the distance equal to the space H between the image plane of the taking lens and the front focal plane of the first relay lens. Since the light from the taking lens is collimated by the first relay lens in any conditions, there is no need to adjust other optical elements like second relay lenses in response to the movement of the first relay lens.

In accordance with the color separation optical system of the present invention as summarized above, the field lens can be removed from the optical system when the extrance pupil of the relay lens system is registered with the exit pupil of the taking lens. When the pupils are not registered with each other, a field lens of a proper power is inserted between the taking lens and the relay lens system. Thus, the quality of image is improved at least when the pupils are registered with each other and it is made unnecessary to prepare a plane parallel plate in a color separation optical system.

DESCRIPTION OF THE PREFERRED EMBODIMENT

Now an embodiment of the present invention will be described in detail with reference to FIGS. 2 and 3.

Figure 1:
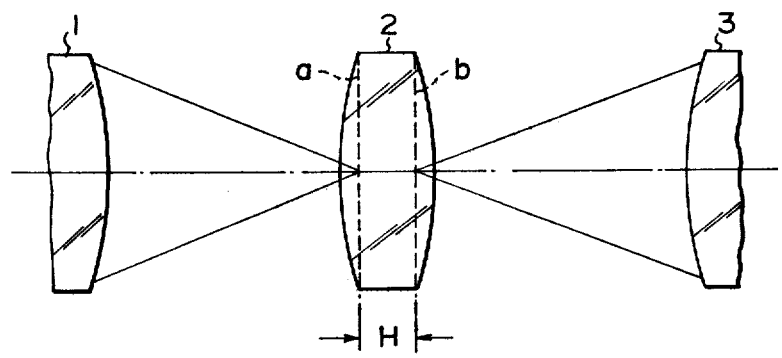
FIG. 1 is an explanatory view showing the taking lens, a field lens and a first relay lens of the relay lens system of a color separation optical system for explaining the problem inherent in the color separation optical system of relay lens type.
Figure 2:
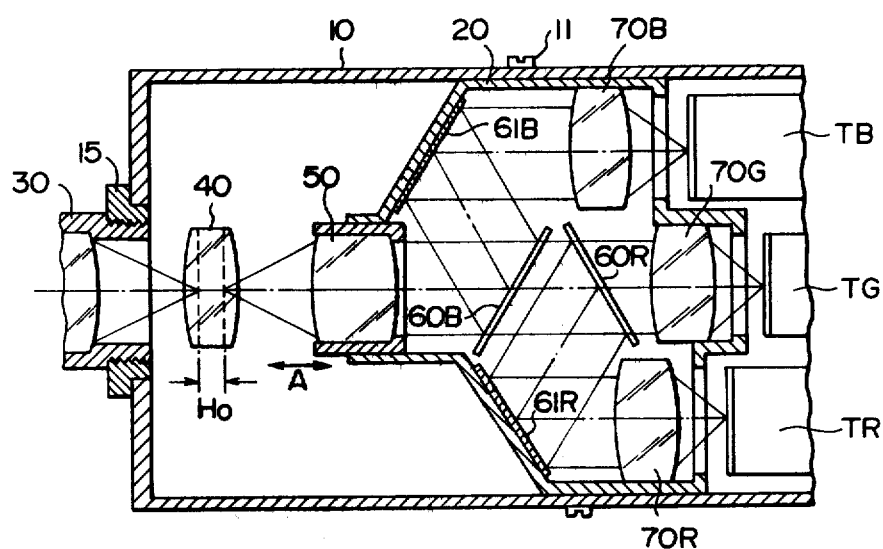
FIG. 2 is a longitudinal sectional view of a color television camera provided with an embodiment of the color separation optical system in accordance with the present invention.

Referring to FIG. 2, a color television camera housing 10 is provided therein with a color separation optical system housing 20. The latter 20 is fixed to the former 10 by means of a screw 11 or the like. The color separation optical system 20 retains therein a first relay lens 50, two dichroic filters 60B and 60R for separation of colors into red, green and blue, two mirrors 61B and 61R for reflecting light which is reflected by the dichroic filters 60B and 60R, and second relay lenses 70B and 70G and 70R. Behind the second relay lenses 70B, 70G and 70R three image pick-up tubes TB, TG and TR are located to receive light coming through the second relay lenses 70B, 70G and 70R. The camera housing 10 is provided on the front face thereof with a taking lens mount 15 for mounting a taking lens 30 to the housing 10. A field lens 40 is located between the taking lens 30 and the first relay lens 50.

The image of the object focused by the taking lens 30 is formed on the first principal plane of the field lens 40 and is transferred to the second principal plane of the field lens 40. The image on the second principal plane of the field lens 40 is relayed to the image pick-up tubes TB, TG and TR by means of the relay lens system including the first and second relay lenses 50, 70B, 70G and 70R. The first relay lens 50 has its front focal plane on the second principal plane of the field lens 40, and accordingly, the light is collimated by the first relay lens 50. The collimated light is partly reflected by the first dichroic filter 60B and the remainder of the light passes therethrough toward the second dichroic filter 60R. The first dichroic filter 60B reflects the blue component of the light and transmits the remainder. The second dichroic filter 60R reflects the red component of the remainder of the light and transmits the green remaining component of the light. The blue component of the light is reflected by the first dichroic mirror 60B, reflected by one of said mirrors 61B, and focused on one of said image pick-up tubes TB through one second relay lens 70B. The red component of the light is reflected by the second dichroic filter 60R, reflected by the other mirror 61R and focused on another image pick-up tube TR through another second relay lens 70R. The green component of the light is transmitted through the two dichroic filters 60B and 60R and is focused on the other image pick-up tube TG through the other second relay lens 70G.

In the color television camera as described above, it is difficult to axially move either the taking lens 30 or the color separation optical system housing 20 in order to make the image plane of the taking lens 30 registered with the front focal plane of the first relay lens 50 of the color separation optical system. This is because the taking lens 30 and the color separation optical system housing 20 are both fixed to the camera housing 10, and that the color separation optical system housing 20 has also image pick-up tubes TB, TG and TR which are very difficult to move.

In the preferred embodiment of the present invention as shown in FIG. 2, the first relay lens 50 is made movable in the axial direction within the color separation optical system housing 20. Since the first relay lens 50 is incorporated in a lens barrel, the movement thereof can easily be conducted by moving the lens barrel.

The present invention further has advantages as follows. When there is an error in manufacture in engagement between the taking lens 30 and the lens mount 15, in relative position between the taking lens mount 15 and the housing 20 namely the engagement between the color separation optical system housing 20 and the color television camera housing 10, or in relative position between the lens mount 15 and the image plane of the taking lens 30, it is possible to eliminate this kind of error by moving the first relay lens 50 in the axial direction. Accordingly, the manufacture of the camera is much facilitated by the possibility of adjustment as above.

Figure 3:
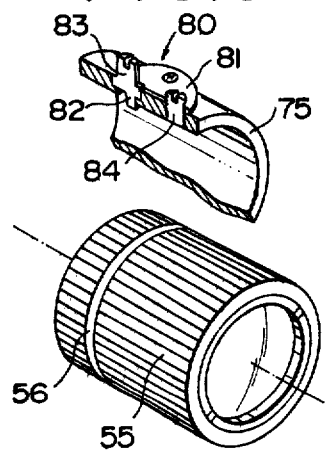
FIG. 3 is an exploded perspective view showing a means for moving the first relay lens of a relay lens system in a color separation optical system which can be employed in the present invention.

FIG. 3 shows an example of the mechanism for conducting the axial movement of the first relay lens 50. A lens barrel 55 has a peripheral groove 56 on the outer periphery thereof. The lens barrel 55 retains fixed therein said first relay lens 50. A guide cylinder 75 for supporting and allowing the axial movement of the lens barrel is provided around the lens barrel 55 and fixed to, for instance, the color separation optical system housing 20. The guide cylinder 75 is provided with a first relay lens moving means 80 which comprises a seat plate 81, a control shaft 83 having an eccentric engaging pin 82 rotatably mounted in said seat plate 81 and a screw 84 screw engaged with the seat plate 81 for clamping the lens barrel 55 to the guide cylinder 75. The control shaft 83 has a minus-shaped groove for driver on the outer end and said eccentric engaging pin 83 on the inner end thereof. The engaging pin 83 is slidably engaged with said peripheral groove 56 of the lens barrel 55.

When moving the first relay lens 50, the screw 84 is first loosened and the control shaft 83 is rotated to move the lens barrel 55 of the first relay lens 50 in the axial direction up to the position where the image plane of the taking lens is registered with the front focal plane of the first relay lens 50, and then the screw 84 is turned to tightly clamp the lens barrel 55 with respect to the guide cylinder 75 which is fixed to the color separation optical system housing 20. By making it possible to rotate the control shaft 83 from outside the camera housing 10, the operation is markedly facilitated.

We claim:

1. A color separation optical system for a color television camera of relay lens type wherein a set of color separating optical elements for separating light from a taking lens into red, green, and blue components of light by reflection and transmission are provided between a single first relay lens and three second relay lenses for the three colors, a removable field lens is provided between the taking lens and the first relay lens, and the light flux between the first relay lens and the second relay lenses is collimated, wherein the improvement comprises means for allowing axial movement of said single first relay lens with respect to the taking lens of the television camera, and means for axially moving said first relay lens, whereby the first relay lens is axially moved independently of the second relay lenses with respect to the taking lens of the camera to the position where the exit pupil of the taking lens if registered with the entrance pupil of the first relay lens.

2. A color separation optical system for a color television camera as defined in claim 1 wherein said first relay lens is mounted in a lens barrel, and the lens barrel is slidably mounted in a guide cylinder, said guide cylinder being provided with said means for axially moving the first relay lens.

3. A color separation optical system for a color television camera as defined in claim 2 wherein said means for moving the first relay lens comprises a peripheral groove provided on the lens barrel, control shaft rotatably mounted in said guide cylinder having an eccentric pin engaged with said peripheral groove, and a clamping means for clamping the lens barrel to the guide cylinder.

* * * * *